(12) United States Patent
Salamon

(10) Patent No.: US 12,118,484 B2
(45) Date of Patent: Oct. 15, 2024

(54) AUTOMATED SERVICES EXCHANGE

(71) Applicant: EMC IP Holding Company LLC, Hopkinton, MA (US)

(72) Inventor: Victor Salamon, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 491 days.

(21) Appl. No.: 17/379,387

(22) Filed: Jul. 19, 2021

(65) Prior Publication Data
US 2023/0015524 A1    Jan. 19, 2023

(51) Int. Cl.
| | |
|---|---|
| H04L 12/24 | (2006.01) |
| G06F 9/54 | (2006.01) |
| G06Q 10/0631 | (2023.01) |
| G06Q 10/0639 | (2023.01) |
| H04L 41/50 | (2022.01) |
| H04L 67/60 | (2022.01) |
| H04L 67/1097 | (2022.01) |

(52) U.S. Cl.
CPC ....... *G06Q 10/06313* (2013.01); *G06F 9/541* (2013.01); *G06Q 10/06395* (2013.01); *H04L 41/50* (2013.01); *H04L 67/60* (2022.05); *H04L 67/1097* (2013.01)

(58) Field of Classification Search
None
See application file for complete search history.

(56) References Cited

U.S. PATENT DOCUMENTS

| | | | |
|---|---|---|---|
| 2017/0344981 A1* | 11/2017 | Jain | G06Q 20/10 |
| 2018/0060894 A1* | 3/2018 | Beveridge | G06Q 30/08 |
| 2018/0062928 A1* | 3/2018 | Beveridge | H04L 41/0893 |
| 2018/0095997 A1* | 4/2018 | Beveridge | H04L 47/70 |

OTHER PUBLICATIONS

McDonough, Jim, "7 Factors to Help You Choose the Right Cloud Service Provider," available at <https://www.threatstack.com/blog/7-factors-to-help-you-choose-the-right-cloud-service-provider>, retrieved on Jul. 16, 2021.

* cited by examiner

*Primary Examiner* — Natisha D Cox
(74) *Attorney, Agent, or Firm* — Ryan, Mason & Lewis, LLP

(57) ABSTRACT

Methods, apparatus, and processor-readable storage media for providing an automated services exchange are described herein. An example computer-implemented method includes obtaining provider requests from one or more service providers, wherein each of the provider requests comprises an indication of at least one type of service provided by the corresponding service provider and attributes associated with the at least one type of the service; processing the provider requests, wherein the processing for a respective one of the provider requests comprises generating a corresponding set of metrics associated with the at least one type of service and the attributes of the respective provider request; and matching a given one of the provider requests to at least one consumer request based at least in part on: the processing and constraints identified in the at least one consumer request with respect to at least a portion of the attributes of the given provider request.

20 Claims, 7 Drawing Sheets

| PROVIDER NAME | PROVIDER A |
|---|---|
| PROVIDER CLOUD SERVICE OFFERING | BLOCK STORAGE, RANDOM ACCESS READ/WRITE |
| PROVIDER CLOUD SERVICE OFFERING REGION | ASIA-PACIFIC |
| PROVIDER SERVICE UNIT | 1 GIGABYTE |
| PROVIDER SERVICE UNIT PRICE BID | $1 |
| PROVIDER SERVICE OFFERING PRICE DATE RANGE | 1 DEC 2020 – 10 DEC 2020, 1AM – 7AM |
| PROVIDER FEE FOR THIS POSTING | $0.05 |

| | |
|---|---|
| CONSUMER NAME | CONSUMER A |
| CONSUMER CLOUD SERVICE REQUEST | COMPUTE |
| CONSUMER CLOUD SERVICE REQUEST REGION | ASIA-PACIFIC |
| CONSUMER SERVICE UNIT | 1 MINUTE |
| CONSUMER SERVICE UNIT PRICE BID | $0.05 |
| CONSUMER SERVICE OFFERING PRICE DATE RANGE | 1 DEC 2020 – 10 DEC 2020, 1AM – 7AM |
| CONSUMER FEE FOR THIS POSTING | $0.05 |

AUTOMATED SERVICES EXCHANGE

FIELD

The field relates generally to information processing systems, and more particularly to techniques for evaluating services (e.g., cloud services) in such systems.

BACKGROUND

Cloud services generally refer to resources provided to cloud users by cloud service providers. Different cloud service providers offer different service tiers and attributes, which often vary over time based on geography and utilization factors, for example. This makes it difficult for a given cloud user to dynamically select and manage cloud services that meet his or her respective service requirements.

SUMMARY

Illustrative embodiments of the disclosure provide techniques for providing an automated services exchange. An exemplary computer-implemented method includes obtaining provider requests from one or more service providers, wherein each of the provider requests comprises an indication of at least one type of service provided by the corresponding service provider and one or more attributes associated with the at least one type of the service; processing the provider requests, wherein the processing for a respective one of the provider requests comprises generating a corresponding set of metrics associated with the at least one type of service and the one or more attributes of the respective provider request; and matching a given one of the provider requests to at least one consumer request based at least in part on: the processing and one or more constraints identified in the at least one consumer request with respect to at least a portion of the one or more attributes of the given provider request.

Illustrative embodiments can provide significant advantages relative to conventional techniques. For example, challenges associated with utilization and management of cloud resources are overcome in one or more embodiments by providing a services exchange that automatically validates cloud services offered by cloud providers and dynamically matches the cloud services to respective cloud users, for example.

These and other illustrative embodiments described herein include, without limitation, methods, apparatus, systems, and computer program products comprising processor-readable storage media.

BRIEF DESCRIPTION OF THE DRAWINGS

FIG. 3 shows an example of a cloud provider record in an illustrative embodiment.

FIG. 4 shows an example of a cloud consumer record in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

There is an increasing number of service providers that provide one or more cloud services, such as, for example, storage services, compute services, and/or network services. These cloud services can be offered at various price levels based on service tiers and attributes, for example. A cloud consumer (e.g., a user that consumes cloud services) typically needs to analyze cloud services across different providers in order to find one that meets the service requirements of the cloud consumer. Analyzing and selecting one or more cloud services can be difficult due to a lack of a centralized system for evaluating assets, services and/or service attributes of the various cloud providers.

Generally, the user is required to manually retrieve and compare information related to the service attributes across providers. This is particularly cumbersome in situations where a user combines services over multiple providers. For example, the user may want to protect against a complete outage from one provider or an outage in the same region, and thus may acquire virtual machines in a particular region from multiple different service providers. Also, the computing asset utilization of a given service provider fluctuates based on demand, which results in dynamic redundancy stemming from temporarily underutilized assets (e.g., by region, by type, and/or by time-of-day). Most service providers do not have a way to dynamically adjust the cloud service offerings or prices of the cloud service offerings in response to the resulting redundancy. Further, the cloud user cannot effectively evaluate attribute changes of cloud services (e.g., service cost per time slice) as these attributes dynamically change over time. This prevents the cloud user from dynamically spreading cloud services between providers or moving service utilization across providers.

Figure 1:
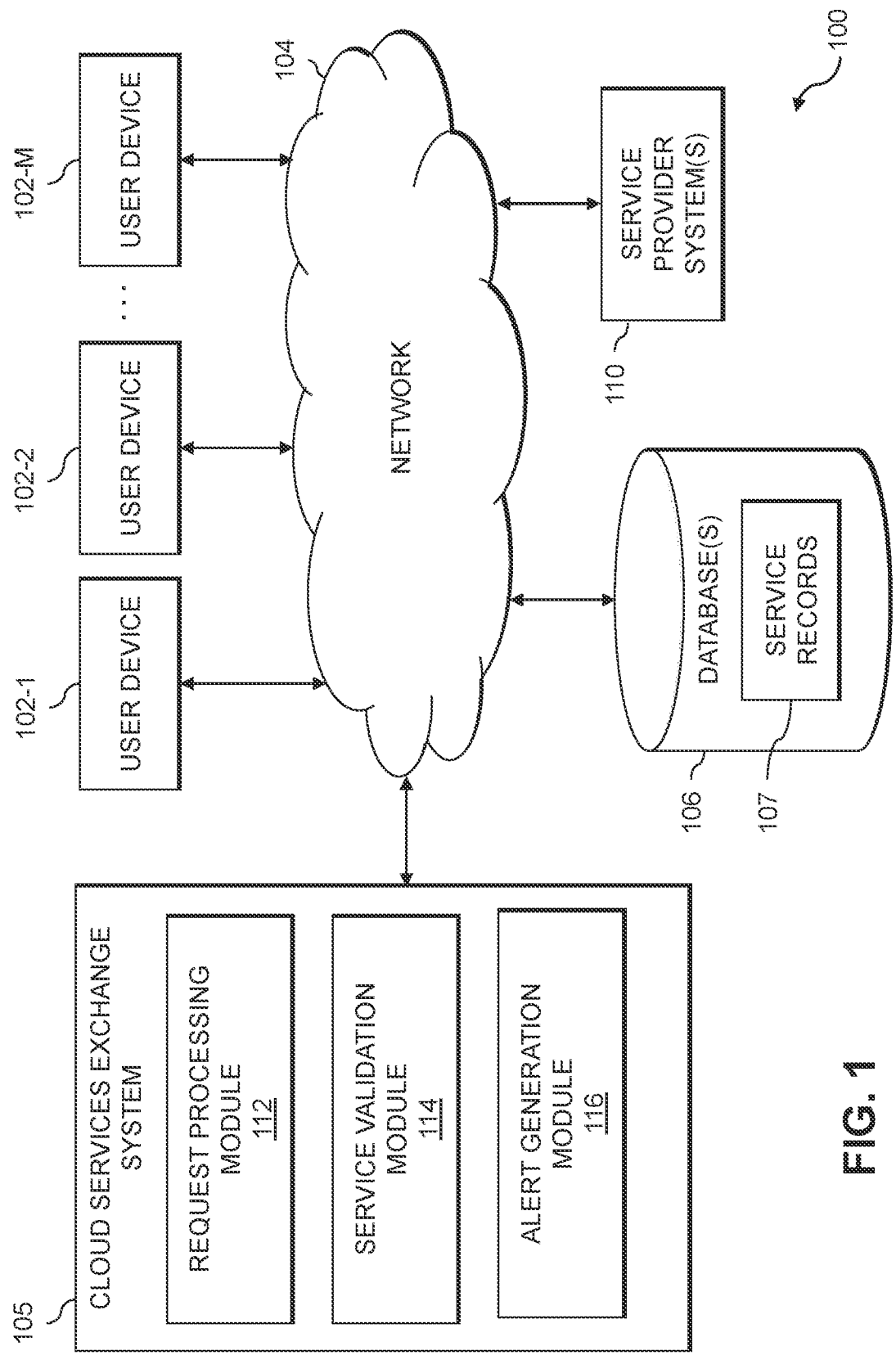
FIG. 1 shows an information processing system configured for providing an automated services exchange in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a cloud services exchange system 105 and one or more service provider systems 110.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The one or more service provider systems 110 may be implemented in a similar manner as user devices 102. Generally, each of the service provider systems 110 provide at least one cloud service to one or more of the user devices 102, as described in more detail elsewhere herein.

Additionally, the cloud services exchange system 105 can have at least one associated database 106 configured to store data pertaining to, for example, service records 107 corresponding to service requests from the user devices 102 and/or provider requests from the service provider systems 110. The term "provider request" in this context and elsewhere herein is intended to be broadly construed so as to encompass, for example, a request to register (or modify) a service offering of a service provider with the cloud services exchange system 105. Additionally, the term "consumer request" in this context and elsewhere herein is intended to be broadly construed so as to encompass, for example, a request to identify one or more service offerings listed by the cloud services exchange system 105. A consumer request may "match" a provider request based in part on, for example, a comparison of one or more attributes specified by the consumer request and one or more attributes associated with the service offering corresponding to the provider request, as described in more detail elsewhere herein.

An example database 106, such as depicted in the present embodiment, can be implemented using one or more storage systems associated with the cloud services exchange system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the cloud services exchange system 105 are one or more input-output devices, which illustratively comprise keyboards, displays or other types of input-output devices in any combination. Such input-output devices can be used, for example, to support one or more user interfaces to the cloud services exchange system 105, as well as to support communication between cloud services exchange system 105 and other related systems and devices not explicitly shown.

Additionally, the cloud services exchange system 105 in the FIG. 1 embodiment is assumed to be implemented using at least one processing device. Each such processing device generally comprises at least one processor and an associated memory, and implements one or more functional modules for controlling certain features of the cloud services exchange system 105.

More particularly, the cloud services exchange system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the cloud services exchange system 105 to communicate over the network 104 with the user devices 102 and the one or more service provider systems 110, and illustratively comprises one or more conventional transceivers.

The cloud services exchange system 105 further comprises a request processing module 112, a service validation module 114, and an alert generation module 116.

It is to be appreciated that this particular arrangement of modules 112, 114 and 116 illustrated in the cloud services exchange system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for cloud services exchange system 105 involving user devices 102 and service provider systems 110 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the cloud services exchange system 105 and database(s) 106 can be on and/or part of the same processing platform.

An exemplary process utilizing modules 112, 114 and 116 of an example cloud services exchange system 105 in computer network 100 will be described in more detail with reference to, for example, the flow diagram of FIG. 5.

The term "cloud service" as used herein is intended to be broadly construed, so as to encompass, for example, resources provided to cloud consumers by cloud service providers. Examples of a cloud service include storage services (e.g., on storage arrays), compute services, and network services. The term "service attribute" as used herein is intended to be broadly construed, so as to encompass, for example, a characteristic of a cloud resource that can be used to distinguish between cloud services. For example, attributes associated with a storage service may include: availability, redundancy, input/output (IO) and management latency, IO bandwidth, bandwidth, geography, distribution, cost per time slice (e.g., second), cost per size (e.g., cost per megabyte (MB)). Attributes associated with a compute service may include, for example: reliability, redundancy, number of nodes, number of CPUs, maximum number of threads, geography, cost per MIPS (millions of instructions per second), compute cycles per time unit, cost per time unit or compute cycle. Examples of attributes for a network service include: bandwidth, latency, redundancy, cost per transfer unit (e.g., MB). In at least some examples, the availability of a standard application programming interface (API) for operations (as opposed to a custom API, which typically target vendor lock-in) may also be considered a service attribute.

Figure 2:
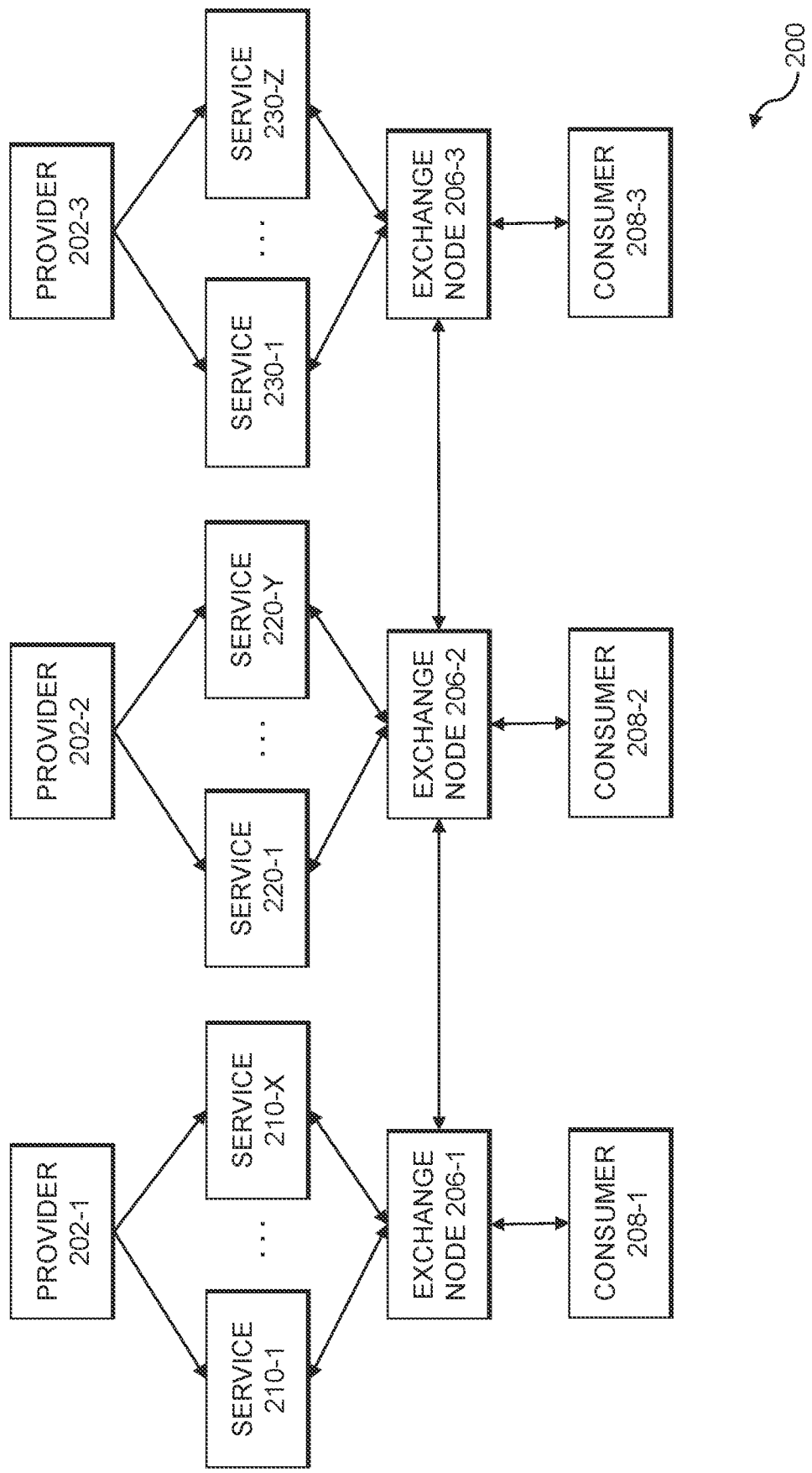
FIG. 2 shows an example of an exchange system architecture in an illustrative embodiment.

FIG. 2 shows an example of an exchange system architecture 200 in an illustrative embodiment. The exchange system architecture 200 includes providers 202-1, 202-2, and 202-3 (collectively referred to as providers 202) that are associated with services 210-1 . . . 210-X (collectively referred to as services 210), services 220-1 . . . 220-Y (collectively referred to as services 220), and services 230-1 . . . 230-Z (collectively referred to as services 230), respectively. Also shown in FIG. 2 are exchange nodes 206-1, 206-2, and 206-3 (collectively referred to as exchange nodes 206); and consumers 208-1, 208-2, and 208-3 (collectively referred to as consumers 208). In some example embodiments, the providers 202, exchange nodes 206, and consumers 208 correspond to the service provider systems 110, the cloud service exchange system 105, and the user devices 102, respectively. It is to be appreciated that the exchange system architecture 200 is not intended to be limiting and there may be a different number of providers 202, exchange nodes 206, and/or consumers 208 in other examples.

The services 210, 220, 230 may be offered with different attributes as noted above. For example, a particular price may be specified per compute cycle, node or thread for a compute service, and a particular price per gigabyte of data may be specified for a storage or network service. It is also noted that a price for read/download operations may be different than a price for write/upload operations, for example. The set of exchange nodes 206 comprises a distributed cluster that provides various functions to the providers 202 and consumers 208. The exchange nodes 206, in at least some embodiments, facilitate consumers 208 to discover, query, notify, compare, and rank the providers 202, services 210, 220, 230 and corresponding attributes offered by the providers 202. Additionally, the exchange nodes 206 allow respective consumers 208 to post requests for particular services and service attributes in accordance with any requirements and/or constraints of the respective consumer 208.

Each of the exchange nodes 206 monitor for requests sent by the providers 202 and consumers 208. A request from a provider 202 may include various information about the service offerings and attributes of the provider 202. The request may be received at one of the exchange nodes 206 via an API. The exchange node 206 persists this request in a record and distributes it with the other exchange nodes 206 in the set. In this manner, the set of exchange nodes 206 act as a cluster, replicating provider records to each other, which provides redundancy, bandwidth, and extra information availability to consumers. The provider record can be modified or deleted by the corresponding provider 202 by sending another request to one of the exchange nodes 206, for example.

FIG. 3 shows an example of a cloud provider record 300 in an illustrative embodiment. In this example, the cloud provider record 300 identifies the following information of the provider: name, cloud service offering, cloud service offering region, service unit, bid price, service offering date range, and provider fee for the posting. Accordingly, at least some example embodiments provide an API for services and service attributes to allow service attributes to be comparable (e.g., expressed in numbers). The exchange nodes 206 may then pre-assemble a listing of services offered by one or more providers 202.

The exchange nodes 206 may independently test the provider-posted test services for various attributes (e.g., service availability, service performance, the availability of a standard API, and vendor-lock-in requirement). In some embodiments, each attribute may be scored independently, and the exchange nodes 206 may create an overall aggregated score for the entire service offering for the particular provider. Optionally, the attribute scores can be normalized on a scale (e.g., 1 to 10).

The consumers 208 may search information related to the records (e.g., record 300) generated for the providers, which can be executed through at least one of a graphical user interface (GUI), a textual user interface, and API, for example. According to at least one embodiment, this enables filtering and sorting capability across all services 210, 220, 230 and their corresponding attributes. For example, consumer 208-1 may indicate preferences related to price, availability, and geographic region; and the consumer 208-1 may sort and compare (manually or automatically) multiple cloud service offerings. The consumer 208-1 may then select one or more services from one or more of the providers 202.

Optionally, the consumer 208 can register service and attribute requirements with the exchange nodes 206. This allows the consumers to specify terms for service attributes including, for example, the price the consumer is willing to pay per unit for a particular service. Similar to the requests from the providers 202, a given one of the exchange nodes 206 may persist the consumer requests in records and distribute them with the other exchange nodes 206. The service request posting can also be modified or deleted.

FIG. 4 shows an example of a cloud consumer record 400 in an illustrative embodiment. In this example, the cloud consumer record 400 identifies the following information: consumer name, consumer cloud service request, cloud service request region, service unit, bid price, service offering date range, and consumer fee for the posting.

Optionally, the exchange nodes 206 provide functionality for the providers 202 to search consumer service requests via a search through a GUI, a textual user interface, or an API, for example. Additionally, or alternatively, the exchange nodes 206 may automatically notify particular ones of the providers 202 of relevant consumer service requests. These requests may be used to analyze fluctuating asset utilization. If a provider has a service that meets a certain request (e.g., based on price and/or other attributes) the provider can post a service offering to satisfy the consumer request. As such, the consumer 208 may sort and compare bids from providers 202, and select one or more of the services and the relevant attributes based on their needs.

Also, in at least some example embodiments, the exchange nodes 206 provide a consumer API that enables the providers 202 to browse information related to the service and attributes that are currently being requested by consumers and adjust their respective offerings. As an example, the API may include at least some of the following operations: register consumer; discover/list service providers; discover/list services offered for a given provider; discover/list attribute names for a given service/provider combination; discover/list attribute values for a given attribute/service/provider combination; upload a request for service and service attribute requirements; provide ranked list provider bids for requests of a consumer; change default ranking weighting; and purchase a service for a time duration from a specified provider, through an exchange node.

Consumers 208 that are registered with the exchange nodes 206 may be notified of service attributes changes and new offerings from the providers 202. Such an alert, in some embodiments, may automatically trigger a change with respect to one or more cloud services currently being consumed by a consumer when there is a better match. Accordingly, services of the consumer can be automatically optimized or balanced based on such alerts. Accordingly, at least some embodiments provide a notification registration and API, which allows providers to be notified of new and updated consumer requests or requirements for cloud services, and consumers to be notified of new and updated provider offerings for cloud services.

The exchange nodes 206 may also utilize a standardized API to allow the consumers 208 to avoid being locked-in to certain services. In such embodiments, the exchange nodes 206 may translate the standard API to custom APIs associated with the providers 202. As an example, for a compute service, the API may include functions to start, stop, pause, and resume a virtual machine (VM), as well as functions to image, configure, scale, and recover the VM. For a storage service, the standardized API may include function for provisioning, reading, and writing, for example. For a network service, functions can be provided for connecting/disconnecting, provisioning, and role-based access control (RBAC). The standardized API may also include functions to mirror or change redundancy or service regions of the services.

In at least one embodiment, the exchange nodes 206 can monetize each provider posting and consumer posting by charging a fee based on at least one of: per-posting, a percentage of the service's offering, and per count of API calls.

As noted elsewhere herein, each attribute of a given service can be scored (e.g., by the exchange nodes 206). The scoring can be performed by one or more test agents (e.g., running on each of the exchange nodes 206 for distributing the tests). The test agent tests service metrics depending on the service and the attribute type. For a compute service, the metrics may include one or more of the following:

Execution duration of a common/standard benchmarking program—For example, test agent starts the program and measures the duration of the execution.

Latency of each operation—For example, the test agent measures the latency of an operation executed from the test agent onto the remote virtual machine associated with the service.

Latency of each remote operation—For example, the test agent measures the latency of an operation executed from the tester agent onto the remote virtual machine.

Availability/uptime—For example, the test agent may regularly log into a VM and checks its uptime; every time the agent cannot access the VM, or it detects a discontinuous uptime, this metric is affected.

Ability to survive domain failure—Domain failures are generally difficult to induce externally. Instead of provoking a domain failure, the test agent monitors a failure of domain (e.g., the failure of a data center in a geographic region). When this failure occurs naturally, the test agent can notice (by listening to service notifications from the vendor) then verify that the service is redundantly offered though a different domain (e.g., from another data center or geography) by attempting remote operations and verifying that they are served correctly.

For a storage service, the metrics may include one or more of the following:

Access latency—The test agent can verify read and write latency to storage, by starting read and write operations and measuring how long they take.

Access throughput—The test agent can verify read and write throughput by starting a stream of read and write operations and determining how many MB per second are transmitted.

Access IOPS (input/output operations per second)—The test agent can verify read and write throughput by starting a stream of read and write operations, and monitoring how many operations per second are completed.

For a network service, the metrics may be determined in a similar manner as the test examples used for the storage service with respect to latency, throughput, and IOPS. An additional metric that may be considered is the availability of a redundant network to serve IO during a network failure. For example, the test agent may wait until a network failure occurs on its own, and then test the redundancy of the service by initiating network operations and expecting them to be executed seamlessly. The network failure may be detected by the test agent by monitoring service notifications from the provider, for example.

In one or more embodiments, cloud services are ranked in such a way that balances the requirements of providers, the requirements of consumers, and the credibility of the exchange system (e.g., cloud services exchange system 105). For example, consumers may search for provider offerings, and the search results may be ranked using a score that is computed based on the following factors: (1) the price-per-unit of the service offering (e.g., the lower the price, the higher the ranking), and (2) service attribute scores that were calculated. In some example embodiments, the following formula may be used to determine a ranking factor of a particular service: $R = PF*(W1*A1 + W2*A2 \ldots + WnAn)/(1 + UP*UW)$, where:

PF is the posting fee for the provider. The higher the fee, the higher the ranking of the posted service, when consumers search for services.

A1 . . . An are numerical values for the service attributes. If a higher value is desired then the attribute has a positive value (e.g., for the "availability" attribute a higher value results in a higher score); and if a lower value is desired then the attribute has a negative value (e.g., for the "latency" attribute, a lower value results in a higher score).

W1 . . . Wn are weighting factors. W1 . . . Wn can be a set of default values, which can be adjusted by consumers when searching and sorting.

UP is the unit price for the service (e.g., dollars per minute for a compute service).

UW is a weighting factor for the denominator. Similar to the attribute weighting factors, the consumer can supply their own value for UW when searching and sorting. In this example, a "1" is added to avoid a division by zero in case of free services.

The search and/or sorting results are ranked according to the value of R, where higher values of R indicate services that are more relevant to the query.

In another example, the paid service postings may be split from the rankings based on service attribute scores. In this case, the ranking formula is split as follows:

$$R2Paid=PF$$

$$R2Organic=(W1*A1+W2*A2 \ldots +WnAn)/(1+UP*UW)$$

For this approach, a subset of paid service postings may be ranked at the top and identified as paid. The postings may be charged at the time of listing or at the time of a service purchase, for example. To protect each spender (providers and consumers), some embodiments track a posting-fee budget for each spender, and when the budget is spent, the spending from that spender stops.

It is to be appreciated that other approaches for ranking services are also possible including approaches that do not account for whether a posting is a paid posting, for example.

Figure 5:
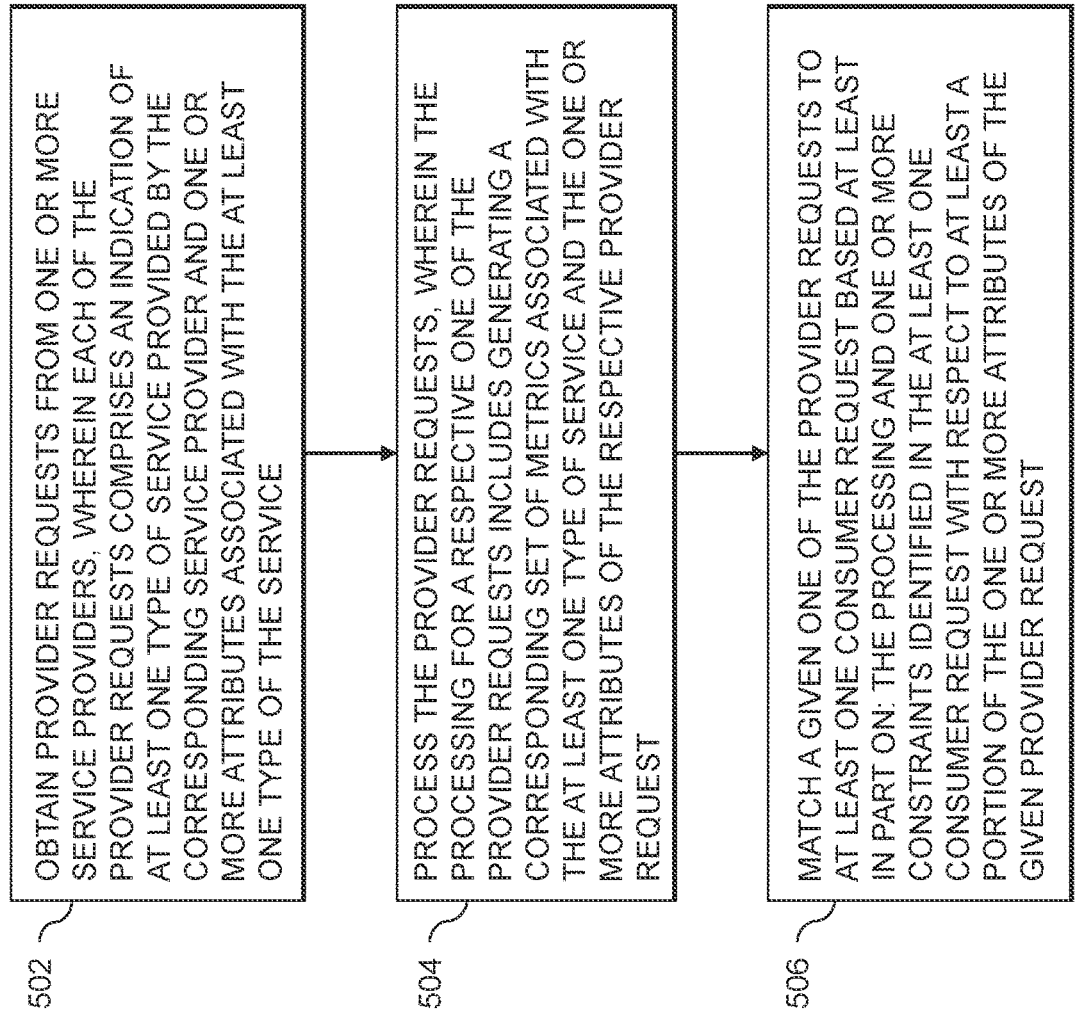
FIG. 5 shows a flow diagram of a process for providing an automated services exchange in an illustrative embodiment.

FIG. 5 is a flow diagram of a process for providing an automated cloud services exchange in an illustrative embodiment. It is to be understood that this particular process is only an example, and additional or alternative processes can be carried out in other embodiments.

In this embodiment, the process includes steps 502 through 506. These steps are assumed to be performed by the cloud services exchange system 105 utilizing its modules 112, 114 and 116.

Step 502 includes obtaining provider requests from one or more service providers, wherein each of the provider requests comprises an indication of at least one type of service provided by the corresponding service provider and one or more attributes associated with the at least one type of the service.

Step 504 includes processing the provider requests, wherein the processing for a respective one of the provider requests comprises generating a corresponding set of metrics associated with the at least one type of service and the one or more attributes of the respective provider request.

Step 506 includes matching a given one of the provider requests to at least one consumer request based at least in part on: the processing and one or more constraints identified in the at least one consumer request with respect to at least a portion of the one or more attributes of the given provider request.

The service corresponding to the given provider request may be consumed by at least one consumer associated with the at least one consumer request in response to the matching. The process depicted in FIG. 5 may further include a step of translating an application programming interface that is specific to the service corresponding to the given provider request to a standardized application programming interface, wherein the at least one consumer consumes the service via the standardized application programming interface. The at least one type of service may include at least one of: providing cloud storage resources; providing cloud network resources; and providing cloud computing resources. The one or more attributes may include one or more service characteristics that distinguish between different services having a same type. The processing may include validating the provider requests. For example, the processing may include testing each of the provider requests with respect to the corresponding sets of metrics; and ranking the provider requests based at least in part on results of the testing. The matching may include filtering the obtained provider requests in response to the one or more constraints identified in the at least one consumer request; and outputting the filtered provider requests to at least one consumer associated with the at least one consumer request based on said ranking. A given one of the provider requests may be received at a first computing node of a set of computing nodes, and wherein the first computing node communicates the given provider request to one or more other computing nodes in the set. The process depicted in FIG. 5 may include a step of automatically generating an alert to at least one of: the service provider associated with the given one of the provider requests and at least one consumer associated with the at least one consumer request based on said matching.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve techniques for managing cloud resources by automatically validating cloud services offered by cloud providers and dynamically matching the cloud services to respective cloud users. Some embodiments provide a standardized application program interface that helps users to easily migrate between different cloud services. These and other embodiments can effectively improve the utilization and management of cloud resources relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
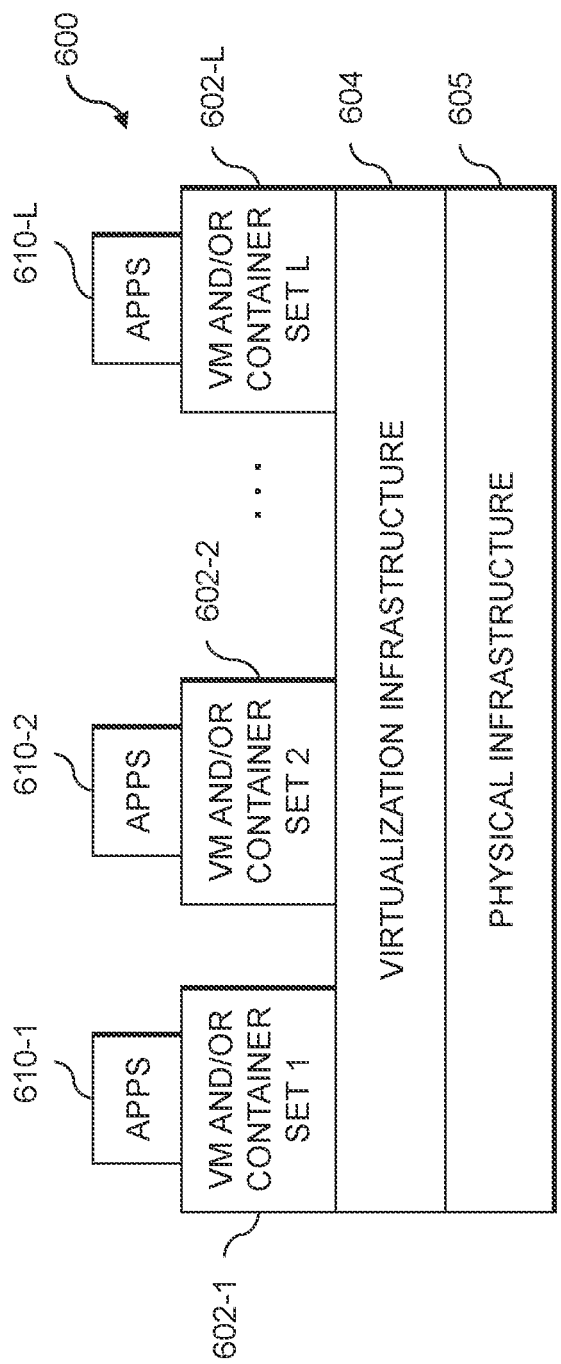
FIGS. 6 and 7 show examples of processing platforms that may be utilized to implement at least a portion of an information processing system in illustrative embodiments.
Figure 7:
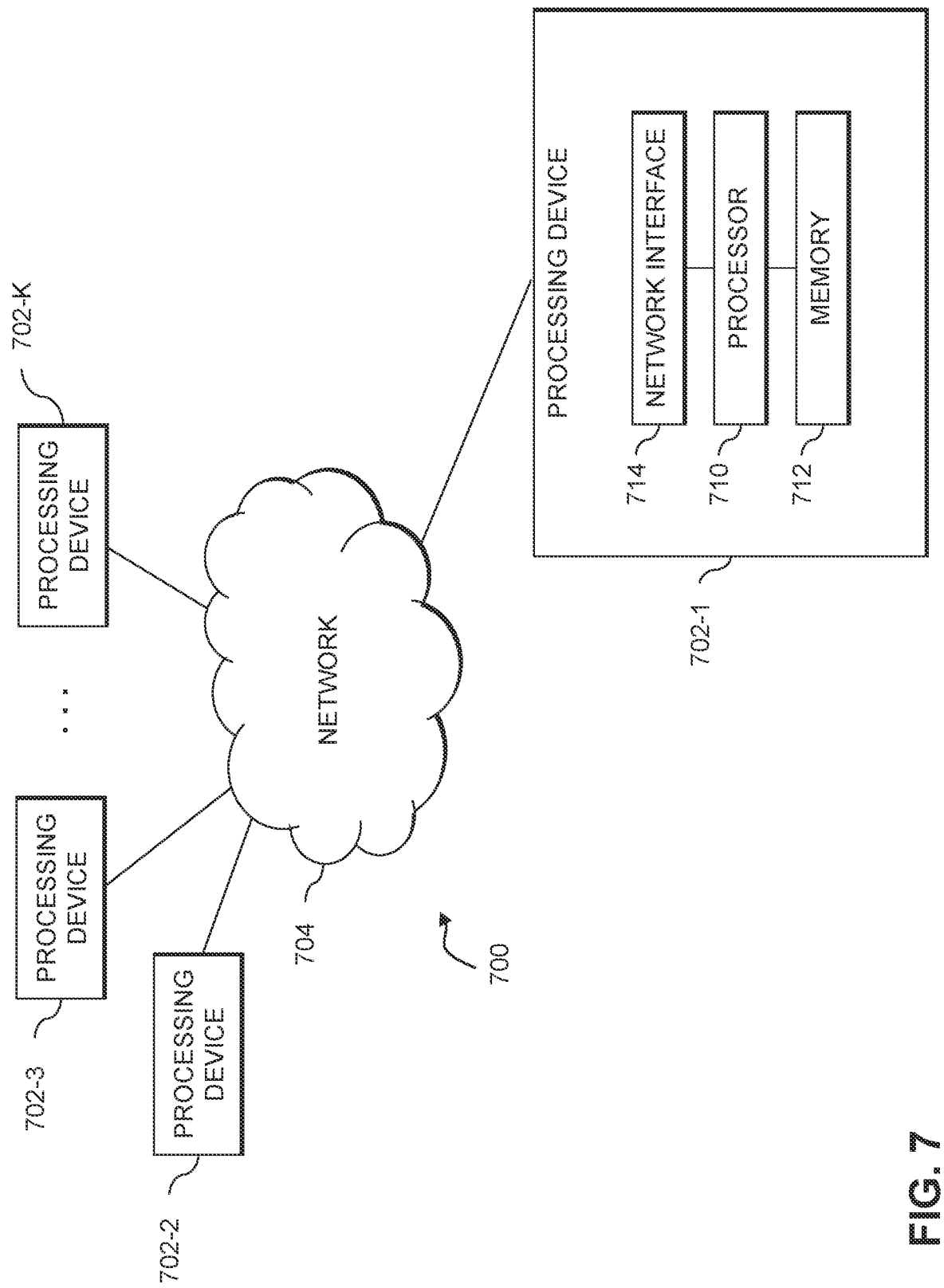

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining, by a services exchange system, provider requests from one or more service providers, wherein each of the provider requests comprises an indication of at least one type of service provided by the corresponding service provider and one or more attributes associated with the at least one type of the service;
   processing, by the services exchange system, the provider requests, wherein the processing for a respective one of the provider requests comprises testing the at least one type of service and the one or more attributes of the respective provider request and generating a corresponding set of metrics associated with the at least one type of service and the one or more attributes of the respective provider request based at least in part on results of the testing; and
   matching, by the services exchange system, a given one of the provider requests to at least one consumer request based at least in part on: the processing and one or more constraints identified in the at least one consumer request with respect to at least a portion of the one or more attributes of the given provider request;
   wherein the method is performed by at least one processing device comprising a hardware processor.

2. The computer-implemented method of claim 1, wherein the service corresponding to the given provider request is consumed by at least one consumer associated with the at least one consumer request in response to the matching.

3. The computer-implemented method of claim 2, further comprising:
   translating an application programming interface that is specific to the service corresponding to the given provider request to a standardized application programming interface, wherein the at least one consumer consumes the service via the standardized application programming interface.

4. The computer-implemented method of claim 1, wherein the at least one type of service comprises at least one of:
   providing cloud storage resources;
   providing cloud network resources; and
   providing cloud computing resources.

5. The computer-implemented method of claim 1, wherein the one or more attributes comprise one or more service characteristics that distinguish between different services having a same type.

6. The computer-implemented method of claim 1, wherein said processing comprises:
   ranking the provider requests based at least in part on the results of the testing.

7. The computer-implemented method of claim 6, wherein said matching comprises:
   filtering the obtained provider requests in response to the one or more constraints identified in the at least one consumer request; and
   outputting the filtered provider requests to at least one consumer associated with the at least one consumer request based on said ranking.

8. The computer-implemented method of claim 1, wherein a given one of the provider requests is received at a first computing node of a set of computing nodes, and wherein the first computing node communicates the given provider request to one or more other computing nodes in the set.

9. The computer-implemented method of claim 1, further comprising:

automatically generating an alert to at least one of: the service provider associated with the given one of the provider requests and at least one consumer associated with the at least one consumer request based on said matching.

10. A non-transitory processor-readable storage medium having stored therein program code of one or more software programs, wherein the program code when executed by at least one processing device causes the at least one processing device:
to obtain, by a services exchange system, provider requests from one or more service providers, wherein each of the provider requests comprises an indication of at least one type of service provided by the corresponding service provider and one or more attributes associated with the at least one type of the service;
to process, by the services exchange system, the provider requests, wherein the processing for a respective one of the provider requests comprises testing the at least one type of service and the one or more attributes of the respective provider request and generating a corresponding set of metrics associated with the at least one type of service and the one or more attributes of the respective provider request based at least in part on results of the testing; and
to match, by the services exchange system, a given one of the provider requests to at least one consumer request based at least in part on: the processing and one or more constraints identified in the at least one consumer request with respect to at least a portion of the one or more attributes of the given provider request.

11. The non-transitory processor-readable storage medium of claim 10, wherein the program code further causes the at least one processing device:
to translate an application programming interface that is specific to the service corresponding to the given provider request to a standardized application programming interface, wherein the at least one consumer consumes the service via the standardized application programming interface.

12. The non-transitory processor-readable storage medium of claim 10, wherein the at least one type of service comprises at least one of:
providing cloud storage resources;
providing cloud network resources; and
providing cloud computing resources.

13. The non-transitory processor-readable storage medium of claim 10, wherein the one or more attributes comprise one or more service characteristics that distinguish between different services having a same type.

14. The non-transitory processor-readable storage medium of claim 10, wherein the processing comprises:
ranking the provider requests based at least in part on the results of the testing.

15. The non-transitory processor-readable storage medium of claim 10, wherein a given one of the provider requests is received at a first computing node of a set of computing nodes, and wherein the first computing node communicates the given provider request to one or more other computing nodes in the set.

16. An apparatus comprising:
at least one processing device comprising a processor coupled to a memory;
the at least one processing device being configured:
to obtain, by a services exchange system, provider requests from one or more service providers, wherein each of the provider requests comprises an indication of at least one type of service provided by the corresponding service provider and one or more attributes associated with the at least one type of the service;
to process, by the services exchange system, the provider requests, wherein the processing for a respective one of the provider requests comprises testing the at least one type of service and the one or more attributes of the respective provider request and generating a corresponding set of metrics associated with the at least one type of service and the one or more attributes of the respective provider request based at least in part on results of the testing; and
to match, by the services exchange system, a given one of the provider requests to at least one consumer request based at least in part on: the processing and one or more constraints identified in the at least one consumer request with respect to at least a portion of the one or more attributes of the given provider request.

17. The apparatus of claim 16, wherein the at least one processing device is further configured:
to translate an application programming interface that is specific to the service corresponding to the given provider request to a standardized application programming interface, wherein the at least one consumer consumes the service via the standardized application programming interface.

18. The apparatus of claim 16, wherein the at least one type of service comprises at least one of:
providing cloud storage resources;
providing cloud network resources; and
providing cloud computing resources.

19. The apparatus of claim 16, wherein the one or more attributes comprise one or more service characteristics that distinguish between different services having a same type.

20. The computer-implemented method of claim 1, wherein the testing the at least one type of service and the one or more attributes of the respective provider request is performed between at least a portion of the services exchange system and the at least one type of service.

\* \* \* \* \*